March 31, 1942.  W. S. EATON  2,277,905
RADIO DIRECTION FINDER
Filed Jan. 30, 1939
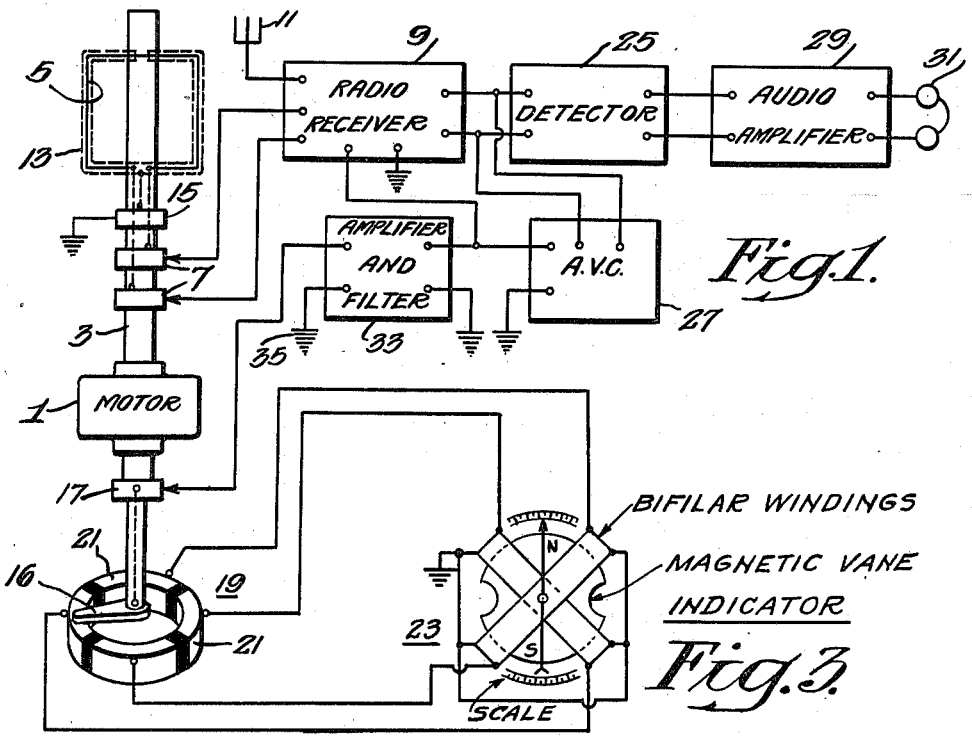
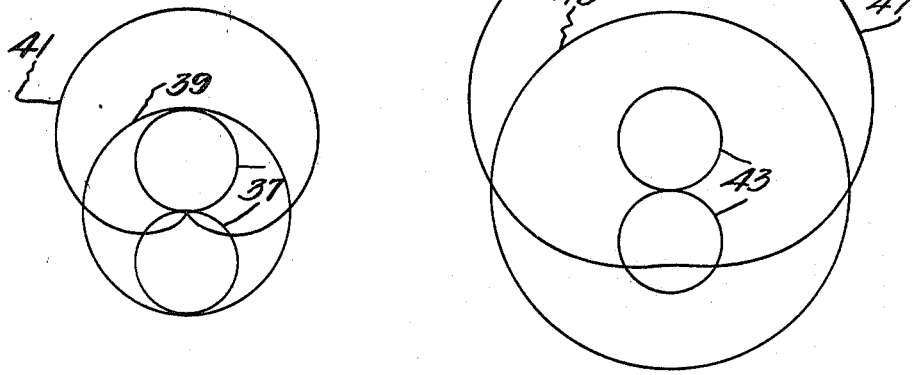
Inventor
Warren S. Eaton
Attorney Patented Mar. 31, 1942

2,277,905

UNITED STATES PATENT OFFICE 2,277,905

RADIO DIRECTION FINDER

Warren S. Eaton, Los Angeles, Calif., assignor to Radio Corporation of America, a corporation of Delaware Application January 30, 1939, Serial No. 253,707

6 Claims. (Cl. 250—11)

My invention relates to radio direction finders and, more especially, to a direction indicating device in which static effects are substantially reduced.

I am aware that it has been previously proposed to use a rotating directive antenna which is suitably connected through a radio receiver to an output indicator for indicating directly radio bearings. Many of the prior art devices include two indications which cause 180° ambiguity. I have found that the prior radio direction finders are responsive to static impulses which deleteriously affect the bearings.

The radio direction finder of the present invention indicates not only the direction but the sense of the direction, thereby avoiding the 180° ambiguity. An object of the present invention is to provide means for reducing the effect of static on the bearing indications. Another object of the invention is to provide means for indicating radio bearings as a function of a 360° scale. A still further object of the invention is to provide a simple inexpensive means for indicating the relations between a fixed phase and a variable phase as may be indicated on a reference scale.

The invention will be described by reference to the accompanying drawing in which Figure 1 is a schematic circuit diagram representing one embodiment of the invention; Figure 2 is a graph indicating a conventional cardioid response pattern; and Figure 3 is a graph indicating a preferred response pattern.

Referring to Fig. 1, a motor 1, which may be energized by any suitable power source, rotates a shaft 3 at a speed of the order of 15 rotations per second. A loop antenna 5 is mounted on one end of the shaft and is connected to slip rings 7. A radio receiver 9 is connected to the slip rings 7. A nondirective antenna 11 is also connected to the radio receiver.

If the loop is shielded, the shielding 13 is grounded through a slip ring 15, or the like. The other end of the motor shaft carries a rotating brush 16, which is connected to a slip ring 17, which will be hereinafter described. The outer portion of the brush 16 engages a commutator 19 made up of several segments 21. The several segments of the commutator are respectively connected to an indicator 23.

The output of the radio receiver, which may be a tuned radio frequency, superheterodyne or like circuit, is connected to a detector 25 and an automatic volume control element 27. The detector output is connected to the input of an audio frequency amplifier 29 whose output circuit includes telephones 31 or other signal indicator. The output of the automatic volume control circuit, hereinafter called AVC, is connected to an amplifier and filter circuit 33. The AVC circuit may also be connected to control the receiver 9. The output from the amplifier and filter 33 is impressed upon ground 35, and the slip ring 17, which is connected to the rotating brush 16.

The operation of the device is essentially as follows:

The signals from a transmitter, whose bearing is to be determined, induce electromotive forces in the loop 5 and the nondirective antenna 11. These electromotive forces establish currents which are amplified in the radio receiver 9 and demodulated in the detector 25. The demodulated signals are preferably amplified and applied to the telephone receivers 31, whereby an operator may listen to telegraphic, telephonic or other signals.

The output of the radio receiver is also impressed upon the AVC circuit which controls the receiver sensitivity in a manner well known to those skilled in the art. The AVC circuit includes a filter having a time constant which permits the flow of currents which are modulated at a frequency which is a function of the rate of loop rotation. I prefer to operate the loop at a low rotational speed, whereby the loop modulation currents in the AVC circuit may be applied to a filter which passes the loop modulation currents and rejects the currents caused by static and currents due to the modulation of the radio transmitter. The currents passed by the filter are applied through the rotating brush and commutator to the indicator. The indicator is arranged to respond to forces which are a function of the loop orientation and the brush orientation 16. By way of example, the indicator may include four inductors arranged in crossed pairs having a common ground connection and having the remaining leads connected to the four commutator segments 21. A magnetic vane is rotatably arranged within the crossed inductors so that the currents through the inductors act upon the vane, which is connected to the pointer of the indicator 23. One suitable type of bearing indicator is disclosed in my copending application Serial No. 253,708, filed January 30, 1939, entitled Phase indicator.

It will be seen that the position of the brush is fixed with respect to the loop and thus provides a reference phase. Since the rotating arm 16 is fixed on the rotating shaft 3 which drives the loop 5, and since the commutator segments and coils of the indicator 23 are fixed, the rotating arm and associated connections have a phase which is independent of the phase of the currents derived by the loop rotating in the approaching wave fronts. Thus the rotating arm and associated connections provide a fixed or reference phase because it is independent of the wave fronts and resulting loop currents. The phase of the maximum response of the loop depends upon the bearings of the radio transmitter. Thus, an indication between relative phases, one of which is fixed and the other of which is variable, will indicate the bearing of the transmitter. In other words the indicator 23 shows the relative phase of the loop orientation and the phase of the modulation current impressed on the received wave by the rotation of the loop. It should be understood that in speaking of the bearings of the transmitter, those skilled in the art recognize that it is the wave front which is indicated and, since the wave front is usually normal to the line of propagation, the wave front indicates the angle of the origin of the wave.

The characteristic of the loop antenna 5 may be represented by the well known figure-of-eight as shown by curve 37 which is illustrated in the graph of Fig. 2. The currents from a nondirectional antenna are indicated by the circular curve 39. If these two responses are combined in proper phase, the resultant characteristic 41 is a cardioid. While a response pattern of this type may be used to give unidirectional indications, I have found that it is desirable to avoid the zero response. This result may be obtained by applying a current of slightly greater amplitude which is derived from the nondirective antenna as indicated by the relative response patterns 43, 45 of the graph of Fig. 3. The resultant combination of the patterns is shown by the curve 47, which will be recognized as a modified cardioid. The advantage of employing a response characteristic as represented by the curve 47 is to diminish the rotating loop modulation effects on the detector output which is amplified and applied to the signal indicating instrument 31. At the same time that the signal response is improved in the telephone receivers, the rotational effect of the modified cardioid pattern retains its ability to correctly indicate bearings.

Thus, the invention has been described as a direction indicating radio compass. The bearing indications are obtained by amplifying and filtering the AVC currents. These currents have a sine wave characteristic due to the rotation of the loop. The frequency of the sine wave is low, making it possible to eliminate all undesired modulation effects by a simple filter. The receiver is arranged so that communication signals may be obtained simultaneously with the bearing indications.

I claim as my invention:

1. In a directional radio system, a directional antenna for deriving currents from the wave front of received signals whose source is to be indicated, means for continuously rotating said directional antenna to modulate said derived currents so that the phase is a function of the relative angular position of said antenna and said wave front, means for automatically controlling the amplitude of said derived currents, means for deriving a variable current from said last-mentioned means, means for indicating the phase of said variable current with respect to a reference phase determined by the angular position of said antenna with respect to a predetermined zero position thereof and means including a commutator having at least four sections for applying said variable currents to said indicating means in synchronism with said antenna rotation.

2. In a device of the character of claim 1, additional means for demodulating and indicating the received signals.

3. A radio compass including in combination a rotatable directive antenna, means for rotating said antenna continuously, means for deriving from said rotating antenna a current modulated as a function of said rotation, a commutator including at least four sections for commutating said last-mentioned current in synchronism with the rotation of said antenna, and means for applying said commutated currents to an indicator.

4. The method of indicating radio bearings which consist in deriving varying electromotive forces from a received wave, controlling the amplitude of said electromotive forces by deriving controlling forces from the received wave, deriving a varying current from said controlling forces, commutating said varying current to obtain not less than four discrete currents and applying the last mentioned currents to indicate the bearing of the wave front of the received waves.

5. The method of indicating radio bearings and receiving radio signals which includes deriving a modulated current from a received radio wave, demodulating said current, obtaining signal information from said demodulated current, demodulating said modulated currents to derive forces for controlling the amplitude of the modulated current, obtaining a varying current from said controlling forces, interrupting said varying current to obtain at least four discrete currents and indicating the bearing of the wave front as a function of the last-mentioned currents.

6. The method of claim 5 in which the varying currents include undesired currents, the additional step of passing the desired varying currents and rejecting the undesired currents.

WARREN S. EATON.